US008145276B2

(12) United States Patent
Lee et al.

(10) Patent No.: US 8,145,276 B2
(45) Date of Patent: Mar. 27, 2012

(54) PORTABLE TERMINAL AND METHOD FOR DISPLAYING EVENTS ACCORDING TO ENVIRONMENT SET IN THE PORTABLE TERMINAL

(75) Inventors: Sang Hoon Lee, Daegu (KR); Young Hae Kim, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 377 days.

(21) Appl. No.: 12/570,466

(22) Filed: Sep. 30, 2009

(65) Prior Publication Data
US 2010/0093329 A1 Apr. 15, 2010

(30) Foreign Application Priority Data
Oct. 13, 2008 (KR) ........................ 10-2008-0100121

(51) Int. Cl.
*H04B 1/38* (2006.01)
*H04M 1/00* (2006.01)

(52) U.S. Cl. .................. 455/566; 455/550.1; 455/414.1; 455/556.1; 455/179.1; 709/219; 709/224; 709/217; 715/764; 715/847

(58) Field of Classification Search .................. 455/566, 455/550.1, 414.1, 179.1, 556.1
See application file for complete search history.

(56) References Cited

U.S. PATENT DOCUMENTS

| 6,405,049 B2* | 6/2002 | Herrod et al. ................. 455/517 |
| 7,295,836 B2* | 11/2007 | Yach et al. ..................... 455/415 |
| 7,505,785 B2* | 3/2009 | Callaghan et al. ............ 455/557 |
| 7,664,738 B2* | 2/2010 | Sohma .......................... 707/769 |
| 7,721,325 B2* | 5/2010 | Lee et al. ........................... 726/4 |
| 8,041,334 B2* | 10/2011 | Yoon .......................... 455/404.2 |
| 8,041,390 B2* | 10/2011 | Jeong et al. ................ 455/556.1 |
| 2005/0265318 A1* | 12/2005 | Khartabil et al. ............. 370/352 |
| 2010/0005393 A1* | 1/2010 | Tokashiki et al. ............. 715/716 |
| 2010/0077337 A1* | 3/2010 | Yang et al. .................... 715/771 |

* cited by examiner

*Primary Examiner* — Marceau Milord
(74) *Attorney, Agent, or Firm* — Jefferson IP Law, LLP

(57) ABSTRACT

An event displaying method and a portable terminal adapted to the method are provided. The method displays events in the portable terminal whose environments are set according to pieces of user information. The method includes setting an environment of the portable terminal based on an environment selected from among the pieces of information, identifying, if a communication event is received by the portable terminal while it is operated in the set environment, connecting information included in the received communication event, determining whether the identified connecting information is included in the selected user information, determining, if it is determined that the identified connecting information is not included in the selected user information, whether the identified connecting information exists in other user information, and displaying, if it is determined that the identified connecting information exists in other user information, the other user information and the communication event.

18 Claims, 7 Drawing Sheets

PORTABLE TERMINAL AND METHOD FOR DISPLAYING EVENTS ACCORDING TO ENVIRONMENT SET IN THE PORTABLE TERMINAL

PRIORITY

This application claims the benefit under 35 U.S.C. §119 (a) of a Korean patent application filed in the Korean Intellectual Property Office on Oct. 13, 2008 and assigned Serial No. 10-2008-0100121, the entire disclosure of which is hereby incorporated by reference.

BACKGROUND OF THE INVENTION

1. Field of the Invention

The present invention relates to portable terminal technology. More particularly, the present invention relates to a method for displaying received events in a portable terminal according to an environment set by users and to a portable terminal adapted to the method.

2. Description of the Related Art

In modern life, electronic devices allowing information to be communicated with and shared by users, such as portable terminals, computers, laptop computers, etc., are necessities of life. These electronic devices now have a log in/log out function that allows a plurality of users to share one electronic device. The log in/log out function refers to a function that allows a plurality of users to use a single portable terminal, for example, and provides respective environments to the users.

In general, portable terminals are recognized as an electronic device that can only be used by a single user. That is, it is common for each individual to possess a portable terminal, rather than an individual to share a portable terminal with other users.

However, with the development of modern society, each user must process numerous complex items, and also frequently process jobs with other users in a group. In order to increase the process efficiency of a job, they may have to share one portable terminal. That is, when one portable terminal is used and shared by a plurality of users, the portable terminal requires a function that can provide environments set by users thereto. When one portable terminal is shared by a plurality of users, a method is required to inform a corresponding user of received communication events by users, such as text messages, voice calls, etc.

SUMMARY OF THE INVENTION

An aspect of the present invention is to address at least the above-mentioned problems and/or disadvantages and to provide at least the advantages described below. Accordingly, an aspect of the present invention is to provide a method for displaying received events in a portable terminal according to environments set by users, and a portable terminal adapted to the method.

In accordance with an aspect of the present invention, a method for displaying events in a portable terminal is provided. The method includes setting an environment of the portable terminal based on an environment selected from among pieces of user information, identifying, if a communication event is received by the portable terminal while it is operated in the set environment, connecting information included in the received communication event, determining whether the identified connecting information is included in the selected user information, determining, if it is determined that the identified connecting information is not included in the selected user information, whether the identified connecting information exists in other user information, and displaying, if it is determined that the identified connecting information exists in other user information, the other user information and the communication event.

In accordance with another aspect of the present invention, a portable terminal whose environments are set according to user information is provided. The terminal includes an RF communication unit for receiving communication events including connecting information, a memory for storing the connecting information and at least one piece of user information including preference information for setting the environments of the portable terminal, a display unit for displaying at least one user icon, corresponding to the user information, and the user information including the connecting information of the communication event, and a controller for setting an environment of the portable terminal according to connecting information selected from among the pieces of user information stored in the memory, for identifying the connecting information of the communication event, received via the RF communication unit, for identifying whether the identified connecting information is included in other user information if the identified connecting information is not included in the selected user information, and for displaying the communication event and the other user information including the identified connecting information if the identified connecting information is included in other user information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

DETAILED DESCRIPTION OF EXEMPLARY EMBODIMENTS

Figure 1:
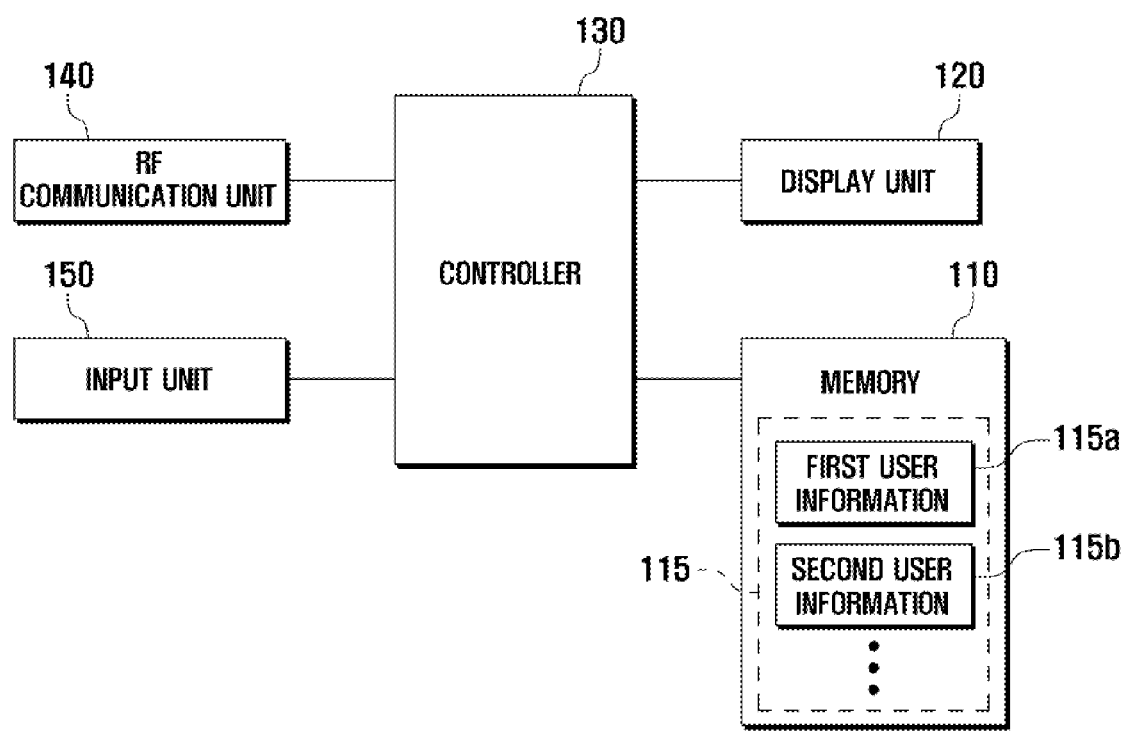
FIG. 1 is a schematic block diagram illustrating a portable terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms or words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the term 'user information' refers to pieces of information stored by users who share a single portable terminal User information may include information regarding a user icon that is displayed with a name or nickname, an image, etc. of users who share a single portable terminal. User information may also contain preference information for setting an environment of a portable terminal. Preference information may contain information regarding a notification function indicating a variety of events occurring in the portable terminal, such as a ringing sound or vibration mode, information regarding a standby screen while the portable terminal is operated in a standby mode, and information regarding passwords set by users. Furthermore, user information may also contain at least one piece of information stored by users. Connecting information may contain the phone book data of another party's portable terminal, such as a phone number, an email address, etc.

The term 'communication event' refers to an event that allows information to be transmitted or received between a portable terminal and the other party's portable terminal. The communication event includes a voice event for allowing voice information to be transmitted or received, a video call event for allowing video information to be transmitted or received, a text transmission-reception event for allowing text information to be transmitted or received, etc. The communication event also includes an email transmission or reception event for allowing email information to be transmitted or received via the Internet, an instant message transmission-reception event for allowing information regarding instant messages to be transmitted or received, etc. A communication event received in a portable terminal may also include connecting information regarding the other party's portable terminal that transmitted the communication event, such as a phone number or an email address of the other party.

FIG. 1 is a schematic block diagram illustrating a portable terminal according to an exemplary embodiment of the present invention.

Referring to FIG. 1, the portable terminal includes a memory 110, a display unit 120, a controller 130, an RF communication unit 140 and an input unit 150.

The memory 110 stores application programs required to operate the portable terminal and a variety of data generated when the portable terminal is operated. In particular, the memory 110 stores user information 115 corresponding to respective users who share the portable terminal. The user information 115 may contain pieces of information corresponding to the number of users sharing the portable terminal. In an exemplary embodiment of the present invention, it is assumed that the user information 115 includes first user information 115a and second user information 115b. The pieces of first and second user information 115a and 115b, set by respective users, may include a user icon, preference information and connecting information. The user icon serves to display a user through an image or name, etc. The preference information and connecting information serve to set an environment of the portable terminal. The preference information may contain information regarding a notification function indicating a variety of events occurring in the portable terminal, such as a ringing sound or vibration mode, and information regarding a standby screen while the portable terminal is operated in a standby mode. The connecting information includes phone numbers of the other party's portable terminals.

The display unit 120 displays user interfaces or menus for the portable terminal. The display unit 120 may be implemented with a Liquid Crystal Display (LCD). If the LCD is implemented with a touch screen, the display unit 120 can also serve as an input device. The display unit 120 can display at least one user icon to set environments set by users in the portable terminal, under the control of the controller 130. The display unit 120 can also display user information 115 under the control of the controller 130, where the user information 115 includes a received communication event, connecting information regarding the communication event and the like.

In the following description, the operations of the display unit 120 are explained in more detail with reference to FIG. 2A, FIG. 2B, FIG. 3 and FIG. 4.

Figure 2A:
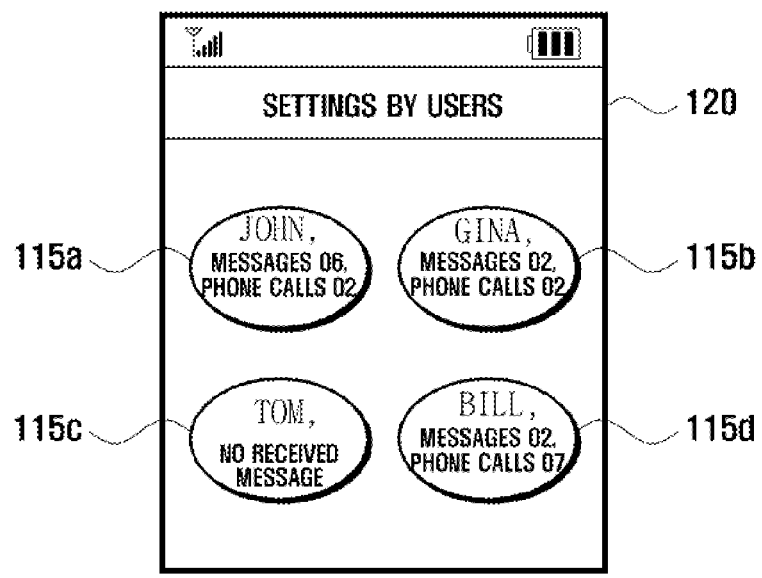
FIG. 2A and FIG. 2B are views displaying a screen to set environments set by users according to an exemplary embodiment of the present invention.
Figure 2B:
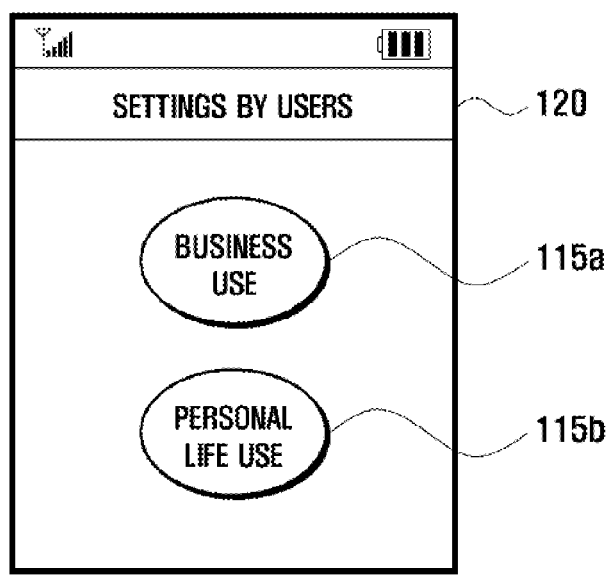
Figure 3:
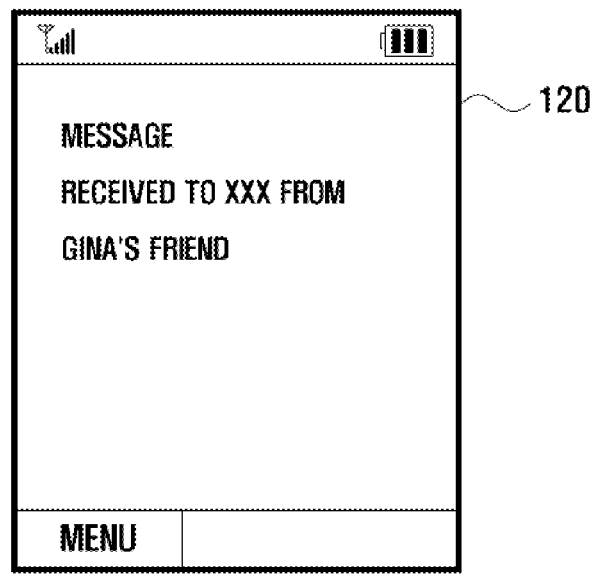
FIG. 3 is a view showing a screen that displays a communication event according to user information according to an exemplary embodiment of the present invention.
Figure 4:
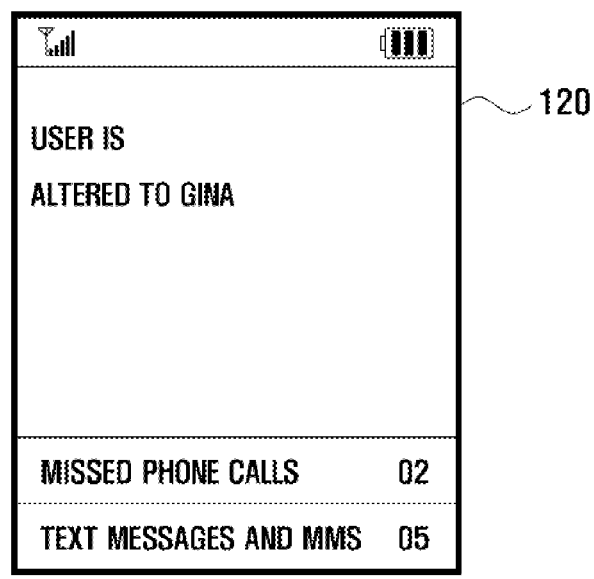
FIG. 4 is a view showing a screen that displays an environment set according to user information according to an exemplary embodiment of the present invention.

FIG. 2A and FIG. 2B are views displaying a screen to set environments set by users according to an exemplary embodiment of the present invention. FIG. 3 is a view showing a screen that displays a communication event according to user information according to an exemplary embodiment of the present invention. FIG. 4 is a view showing a screen that displays an environment set according to user information according to an exemplary embodiment of the present invention.

Referring to FIGS. 2A and 2B, the display unit 120 displays user icons according to user information 115 stored in the memory 110, under the control of the controller 130. In an exemplary embodiment of the present invention, it is assumed that the memory 110 stores first user information 115a set by a user, John, second user information 115b set by a user, Gina, third user information 115c set by a user, Tom, and fourth user information 115d set by a user, Bill. In that case, as shown in FIG. 2A, the display unit 120 displays the user icons of John corresponding to the first user information 115a, of Gina corresponding to the second user information 115b, of Tom corresponding to the third user information 115c, and of Bill corresponding to the fourth user information 115d.

As shown in FIG. 2A, the display unit 120 can also display stored communication events and user icons together. An example of a communication event is a missed communication event. For example, if the memory 110 stores missed communication events comprising of six missed messages and two missed phone calls in the first user information 115a, two missed messages and five missed phone calls in the second user information 115b, no missed messages and no missed phone calls in the third user information 115c, and two missed messages and seven missed phone calls in the fourth user information 115d, the display unit 120 can display the first user icon with messages 06 and phone calls 02, the second user icon with messages 02 and phone calls 05, the third user icon with no received messages, and the fourth user icon with messages 02 and phone calls 07.

In an exemplary embodiment of the present invention, it is also assumed that the memory stores information regarding a user's business, corresponding to the first user information 115a, and information regarding a user's personal life, corresponding to the second user information 115b. In that case, as shown in FIG. 2B, the display unit 120 displays a user icon of business corresponding to the first user information 115a and a user icon of personal life corresponding the second user information 115b. The display unit 120 can also display the respective user icons of business and personal life, together with missed communication events with the number of messages and phone calls.

When the portable terminal, whose environment is set according to the user information 115, receives a communication event, the received communication event and connecting information contained therein are displayed on the display unit 120. For example, if a received communication event is a text message and connecting information, contained in the received communication event, corresponds to connecting information stored in the second user information 115b set by Gina, the controller 130 controls the display unit 120 to display that a text message, as a communication event, is received by Gina related to the second user information 115b, as shown in FIG. 3.

Meanwhile, if the portable terminal changes its environment, set for the first user information 115a, into an environment for the second user information 115b, the display unit 120 displays the second user information 115b according to the changed environment and communication events containing connecting information stored in the second user information 115b, where the communication events were received when the portable terminal was operated in an environment of the first user information 115a. For example, if the second user information 115b corresponding to a user, Gina, is selected in the portable terminal whose environment is set according to the first user information 115a, the controller 130 changes the environment of the portable terminal from the first user information 115a to the second user information 115b. Then, as shown in FIG. 4, the controller 130 controls the display unit 120 to display a message indicating that a user is changed to Gina corresponding to the second user information 115b. After that, if missed communication events, i.e., two missed phone calls and five received text messages and Multimedia Messaging Service (MMS) messages, are stored in the second user information 115b, the controller 130 controls the display unit 120 to display two missed phone calls and five received text messages and MMS messages.

The controller 130 controls the states and functions of elements included in the portable terminal. In particular, if environments set by users are selected via a menu or the input unit 150, the controller 130 controls the display unit 120 to display at least one user icon which corresponds to user information 115 stored in the memory 110. If a particular user icon displayed on the display unit 120 is selected, the controller 130 identifies user information 115 corresponding to the selected user icon. The controller 130 sets the portable terminal according to the identified user information 115. That is, the controller 130 can set an environment of the portable terminal using preference information included in the user information 115, for example, information regarding a standby screen, and set notification information, such as a ring sound or vibration mode.

As the environments of the portable terminal can be set according to selected user information, users sharing the portable terminal can use services through the portable terminal, based on their own settings, respectively. Furthermore, if the portable terminal is not shared by a plurality of users but used by only a single user, the single user can set the environment of the portable terminal for business use or personal life use.

When the portable terminal receives a communication event via the RF communication unit 140, the controller 130 controls the display unit 120 to display the received communication event and the user information 115 corresponding thereto. For example, if the portable terminal is set to operate in an environment set by the first user information 115a and receives a communication event via the RF communication unit 140, the controller 130 identifies connecting information of the other party's portable terminal that sent the communication event. The controller 130 determines whether the identified connecting information corresponds to connecting information stored in the first user information 115a. If the controller 130 ascertains that the identified connecting information corresponds to connecting information stored in the first user information 115a, it displays the received communication event and the connecting information on the display unit 120.

On the contrary, if the controller 130 ascertains that the identified connecting information does not correspond to connecting information stored in the first user information 115a, it determines whether the identified connecting information corresponds to connecting information stored in the second user information 115b. If the controller 130 ascertains that the identified connecting information corresponds to connecting information stored in the second user information 115b, it controls the display unit 120 to display a user name and communication event corresponding to the second user information 115b. The controller 130 may include the communication event and the connecting information, as a missed communication event, in the second user information 115b and then store it in the memory 110.

If a communication event corresponding to connecting information stored in the second user information 115b is received, the controller 130 determines whether a reception rejection is selected via the input unit 150. If a reception rejection has been selected, the controller 130 includes connecting information, as a reception rejection list, in the first user information 115a, and then stores it in the memory 110. In that case, although the portable terminal, set to be operated in an environment according to the first user information 115a, receives a communication event corresponding to connecting information stored in the second user information 115b, the controller 130 does not display the received connecting information on the display unit 120, where the received connecting information corresponds to connecting information contained in the reception rejection list stored in the first user information 115a.

The RF communication unit 140 allows for communication between the portable terminal and a base station. It includes an RF transmitter for up-converting the frequency of transmitted signals and amplifying the transmitted signals, an RF receiver for low-noise amplifying received RF signals and down-converting the frequency of the received RF signals, and a duplexer for isolating the RF receiver from the RF transmitter while permitting communication or vice versa. In particular, the RF communication unit 140 can receive communication events, such as a voice call event, a video call event, a text message transmitting/receiving event, etc., from the other party's portable terminal via the base station. The communication events may also include connecting information, such as a phone number of other party's portable terminal.

The input unit 150 includes keys for inputting numbers and letter information, function keys for setting a variety of functions, and direction keys. In particular, in an exemplary embodiment of the present invention, the function keys may allow users to set environments in the portable terminal. In addition, the direction keys may serve to select user icons displayed on the display unit 120 in order for users to set environments in the portable terminal.

Although it is not illustrated in the exemplary embodiments of the present invention, it should be understood that the portable terminal may further include a plurality of parts for providing various corresponding services, for example, a camera for taking pictures, a Digital Multimedia Broadcasting (DMB) receiver, etc.

In the following description, a method is explained for displaying communication events received in environments of the portable terminal set by users, respectively.

Figure 5:
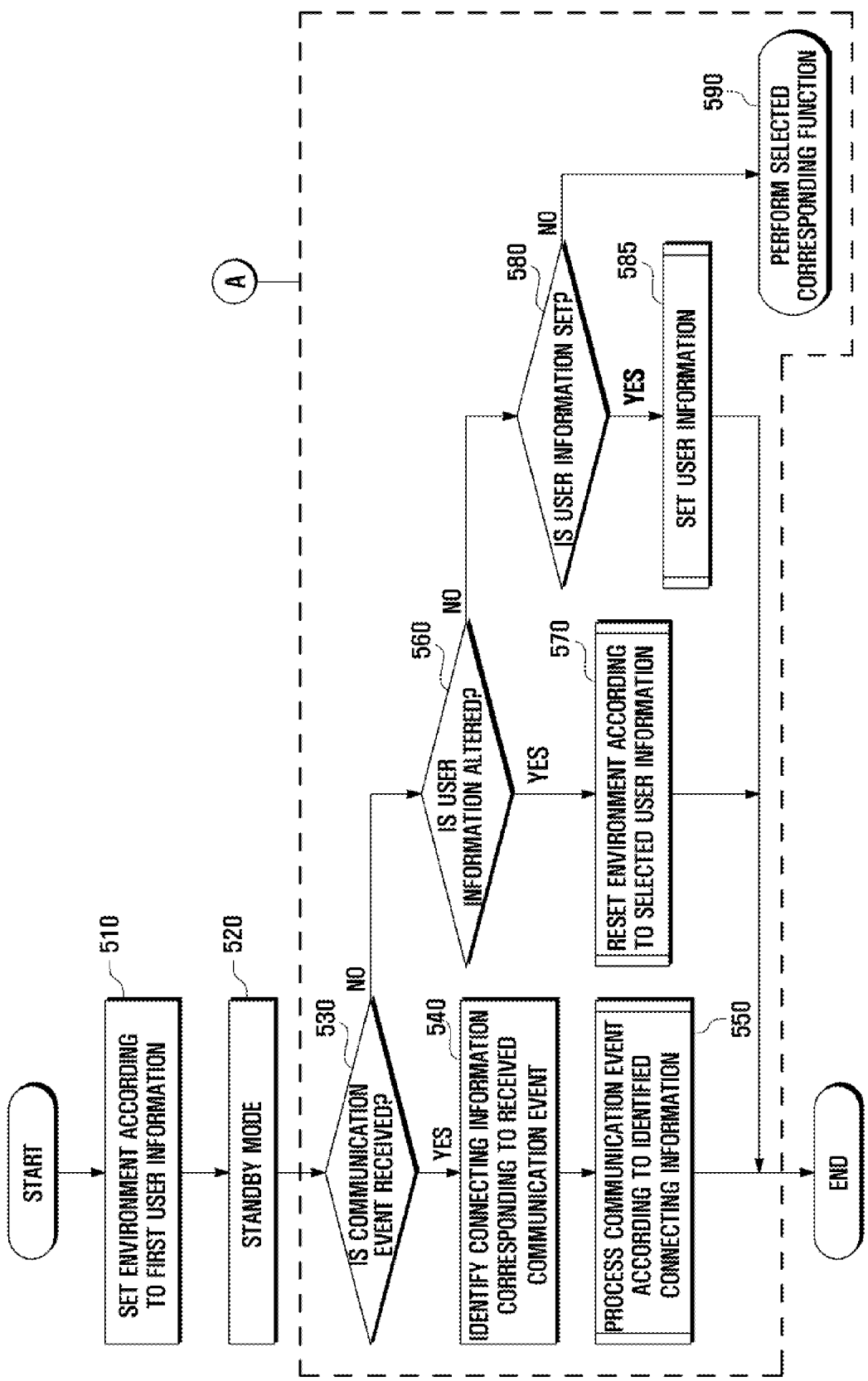
FIG. 5 is a flowchart describing a method for displaying a communication event in an environment set according to user information according to an exemplary embodiment of the present invention.

FIG. 5 is a flowchart describing a method for displaying a communication event in an environment set according to user information according to an exemplary embodiment of the present invention.

Referring to FIG. 5, when the portable terminal is booted or its environments set by users are selected by pressing a menu or a function key, the controller 130 displays at least one user icon on the display unit 120. The controller 130 detects a user icon selected via the input unit 150. If the selected user icon is a first user icon, the controller 130 identifies the first user information 115*a* corresponding to the selected first user icon.

The controller 130 sets the environment of the portable terminal according to the identified first user information 115*a* in step 510. That is, the controller 130 can set the environment of the portable terminal using the preference information contained in the first user information 115*a*. The preference information may include information regarding a standby screen displayed during the standby mode, notification information for notifying generated events, such as a ringing sound or vibration mode, and the like.

After setting the environment of the portable terminal according to the identified first user information 115*a*, the controller 130 switches the current mode of the portable terminal to a standby mode in step 520. During the standby mode, the controller 130 may display a standby screen that was set in the preference information of the first user information 115*a*. The controller 130 determines whether a communication event is received via the RF communication unit 140 in step 530.

If the controller 130 ascertains that a communication event is received at step 530, it identifies connecting information included in the received communication event in step 540. The received communication event may be one of the voice call event, video call event, text reception event and the like. The connecting information may be a phone number of the other party's portable terminal that transmitted the communication event, and the like. After that, the controller 130 processes the communication event according to the identified connecting information in step 550, which is described in more detail with reference to FIG. 6.

Figure 6:
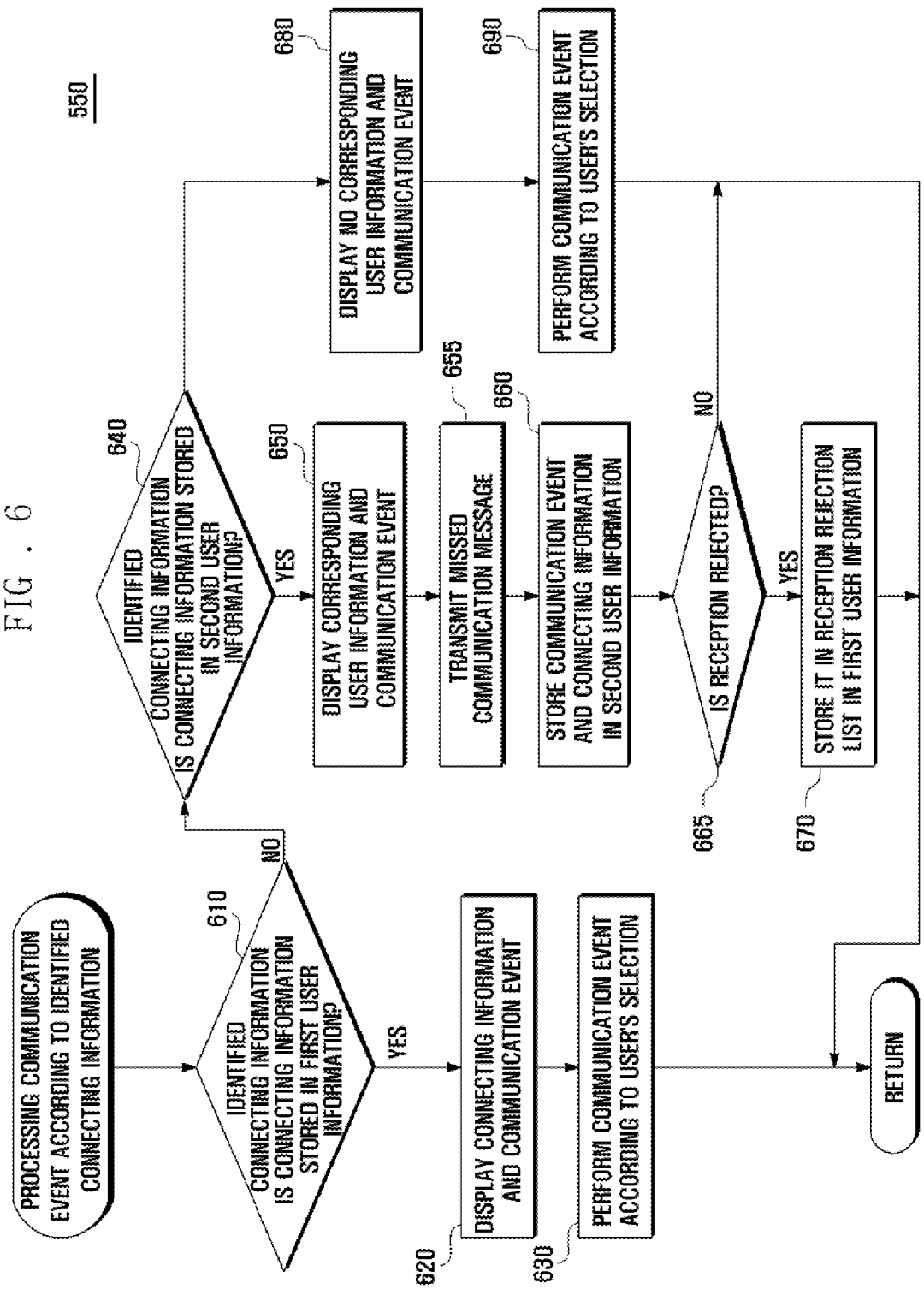
FIG. 6 is a flowchart describing a method for displaying a communication event according to user information according to an exemplary embodiment of the present invention.

FIG. 6 is a flowchart describing a method for displaying a communication event according to user information according to an exemplary embodiment of the present invention.

Referring to FIG. 6, after identifying connecting information included in the received communication event at step 540, the controller 130 determines whether the identified connecting information corresponds to connecting information stored in the first user information 115*a* in step 610.

If the controller 130 ascertains that the identified connecting information corresponds to connecting information stored in the first user information 115*a* at step 610, it displays the identified connecting information and the communication event on the display unit 120 in step 620. After that the controller 130 performs the communication event according to a user's selection in step 630. For example, if the communication event is a voice or video call event and the controller 130 receives a call key via the input unit 150, the controller 130 performs a voice or video call with the other party's portable terminal. If the communication event is a text reception event and the controller 130 receives a confirmation key input by a user via the input unit 150, the controller 130 displays the received text on the display unit 120 and then returns to the procedure of FIG. 5.

On the contrary, if the controller 130 ascertains that the identified connecting information does not correspond to connecting information stored in the first user information 115*a* at step 610, it determines whether the identified connecting information corresponds to connecting information stored in the second user information 115*b* in step 640. If the controller 130 ascertains that the identified connecting information corresponds to connecting information stored in the second user information 115*b* at step 640, it displays the second user information 115*b*, which stores the identified connecting information, and the communication event on the display unit 120 in step 650. For example, as shown in FIG. 3, the controller 130 displays corresponding user information on the display unit 120, where the corresponding user information is that 'a message as a communication event has been received by Gina corresponding to the second user information 115*b*.'

After that, the controller 130 transmits a missed communication message to the other party's portable terminal corresponding to the identified connecting information via the RF communication in step 655. It should be understood that the transmission of the missed communication message can be omitted according to a user's selection. It should be also understood that a missed communication message is transmitted via a stored voice message or a text message.

Next, the controller 130 includes the received communication event and the connecting information in the second user information 115*b* and then stores it in step 660. The stored communication event and connecting information may be displayed as a missed communication event when the environment of the portable terminal is set according to the second user information 115*b*. Therefore, the user corresponding to the second user information 115*b* can identify the number of received communication events when he/she was not using the portable terminal.

After that, the controller 130 determines whether a reception rejection is selected via a menu or the input unit 150 in step 665. That is, if the connecting information of the communication event is included in the connecting information stored in the second user information 115*b*, the controller 130 determines whether the connecting information of the communication event is recorded in the reception rejection list of first user information 115a.

When the controller 130 ascertains that a reception rejection is selected via a menu or the input unit 150 at step 665, it includes the identified connecting information in the reception rejection list of the first user information 115a and stores it in step 670. Therefore, when the environment of the portable terminal according to the first user information 115a is set, and a communication event corresponding to the connecting information stored in the second user information 115b is received, the controller 130 determines whether the connecting information of the received communication event is connecting information set as a reception rejection. After that, the controller 130 may not display the received communication event and the connecting information according to the determination. Although the exemplary embodiment of the present invention is implemented in such a way that only identified connecting information is set in a reception rejection list, it should be understood that the controller 130 can record connecting information according to remaining user information, other than user information corresponding to the current environments of the portable terminal, in a reception rejection list of user information corresponding to the current environment of the portable terminal, according to a user's selection. After that, the controller 130 returns to the procedure of FIG. 5.

On the contrary, if the controller 130 ascertains that the identified connecting information does not correspond to connecting information stored in the second user information 115b at step 640, it displays a message, indicating that there is no corresponding user information, and the communication event on the display unit 120 in step 680. The controller 130 performs a communication event according to a user's selection in step 690. For example, if the communication event is a text reception event, the controller 130 determines whether a confirmation key is input via the input unit 150. If the controller 130 receives a confirmation key, it displays the received text on the display unit 120. Also, if the communication event is a voice or video call event and the controller 130 receives a call key via the input unit 150, the controller 130 performs a voice or video call with the other party's portable terminal. After performing the communication event according to the user's selection, the controller 130 returns to the procedure of FIG. 5.

In an exemplary embodiment of the present invention described above, the controller 130 receives a communication event, identifies connecting information contained in the received communication event, and determines whether the identified connecting information is stored in the first user information 115a or the second user information 115b. However, it should be understood that the exemplary embodiment may be modified in such a way that, if a plurality of pieces of user information 115 are stored in the memory 110, the controller 130 checks all pieces of connecting information stored in the plurality of pieces of user information 115 and then determines whether user information 115, including connecting information corresponding to a communication event, exists.

Referring back to FIG. 5, if the controller 130 ascertains that a communication event is not received at step 530, it determines whether user information modification is selected via a menu or function keys in step 560. If the controller 130 ascertains that a user selects user information modification via a menu or function keys at step 560, it resets the environment of the portable terminal according to the selected user information 115 in step 570, which is described in more detail with reference to FIG. 7.

Figure 7:
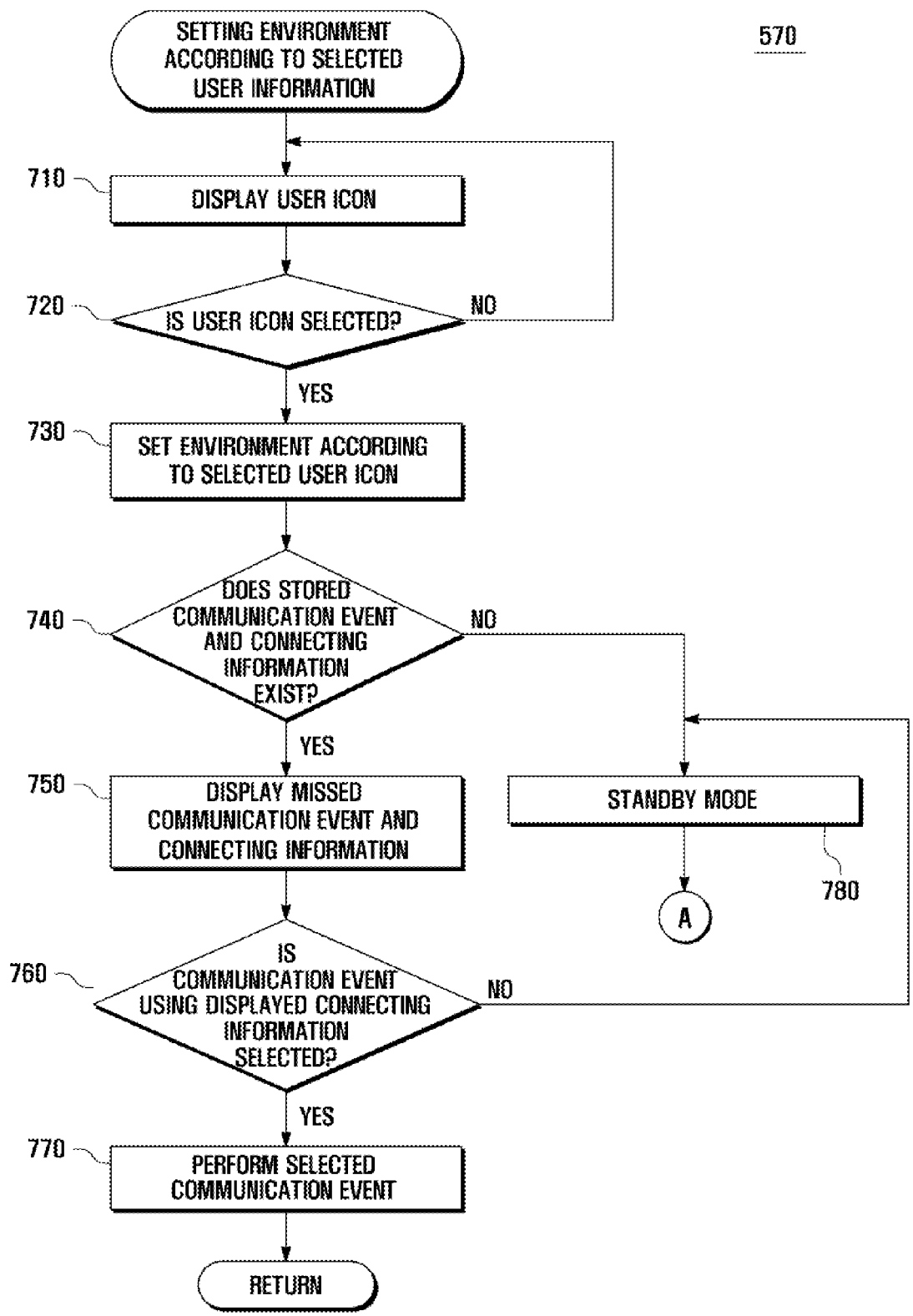
FIG. 7 is a flowchart describing a method for setting an environment according to altered user information according to an exemplary embodiment of the present invention.

FIG. 7 is a flowchart describing a method for setting an environment according to altered user information according to an exemplary embodiment of the present invention.

Referring to FIG. 7, when a user selects a user information modification via a menu or function keys at step 560, the controller 130 controls the display unit 120 to display at least one user icon corresponding to user information 115 stored in the memory 110 in step 710. The controller 130 determines whether a missed communication event is included in user information stored in the memory 110, and then displays the identified missed communication event and the user information on the display unit 120.

Next, the controller 130 determines whether a selection is made from among the user icons displayed on the display unit 120 in step 720. If a selection is made from among the displayed user icons via the input unit 150, the controller 130 sets the environment of the portable terminal according to the selected user icon in step 730. More specifically, the controller 130 identifies user information 115 corresponding to the selected user icon and then sets the environment of the portable terminal according to the identified user information 115. The controller 130 determines whether a password is set in the user information 115 corresponding to the selected user icon. If it is determined that a password is set in the user information 115, the controller 130 displays a password input field on the display unit 120. When a password is input in the password input field via the input unit 150, the controller 130 compares the input password with the set password. If it is determined that the input password is consistent with the set password, the controller 130 sets the environment of the portable terminal according to corresponding user information 115.

After setting the environment of the portable terminal according to the selected user icon at step 730, the controller 130 determines whether the memory 110 stores a communication event and connecting information in step 740. The communication event refers to a missed communication event that was received by the portable terminal while it was operating in an environment set according to user information 115 of other users, or that corresponds to a current environment of the portable terminal and includes connecting information stored in user information 115 of a current user.

If it is determined that the memory 110 stores a missed communication event and connecting information at step 740, the controller 130 displays the missed communication event and connecting information on the display unit 120 in step 750. In an exemplary embodiment of the present invention, although both the connecting information and a communication event are displayed together, it should be understood that the present invention is not so limited. For example, the connecting information may or may not be displayed on the display unit 120 according to a user's selection. That is, as shown in FIG. 4, the controller 130 can display only user information 115 corresponding to a current environment of the portable terminal and communication events received in the current environment, on the display unit 120.

After displaying at step 750, the controller 130 determines whether a communication event is selected using the displayed connecting information, via the input unit 150 in step 760. If it is determined that the communication event has been selected at 760, the controller 130 performs the selected communication event in step 770. For example, if a text transmission event is selected using the displayed connecting information, the controller 130 displays a text input field on the display unit 120. The controller 130 displays text, input via the input unit 150, on the display unit 120. When the controller 130 detects a transmission key or confirmation key input via the input unit 150, it transmits the text to the other party's portable terminal corresponding to the selected connecting information, via the RF communication unit 140. As another example, if a voice or video call event is selected using the displayed connecting information, the controller 130 can allow the portable terminal to make a voice or video call with the other party's portable terminal corresponding to the selected connecting information.

On the contrary, if it is determined that the memory 110 does not store a communication event and connecting information at step 740 or that the communication event has not been selected using the displayed connecting information at step 760, the controller 130 operates in a standby mode where a preset standby screen is displayed on the display unit 120 in step 780. After that, the controller 130 performs procedure A that includes substantially the same steps 530–590 as the procedure of FIG. 5.

Therefore, the controller 130 can also identify communication events, received in an environment of the portable terminal set according to the second user information 115b, and can display types of communication events and corresponding user information 115 on the display unit 120. If it is determined that a user information modification is selected via a menu or an input unit 150, the controller 130 can set the environment of the portable terminal according to the selected user information 115. Consequently, the portable terminal can individually set different environments according to different users, and thus can provide the users with corresponding services.

Referring back to FIG. 5, if it is determined that a user does not select a user information modification is selected via a menu or function keys at step 560, the controller 130 determines whether a user information setting is selected via an input unit 150 in step 580. If it is determined that a user information setting is selected at step 580, the controller 130 sets user information 115 in step 585, which is explained in more detail with reference to FIG. 8.

Figure 8:
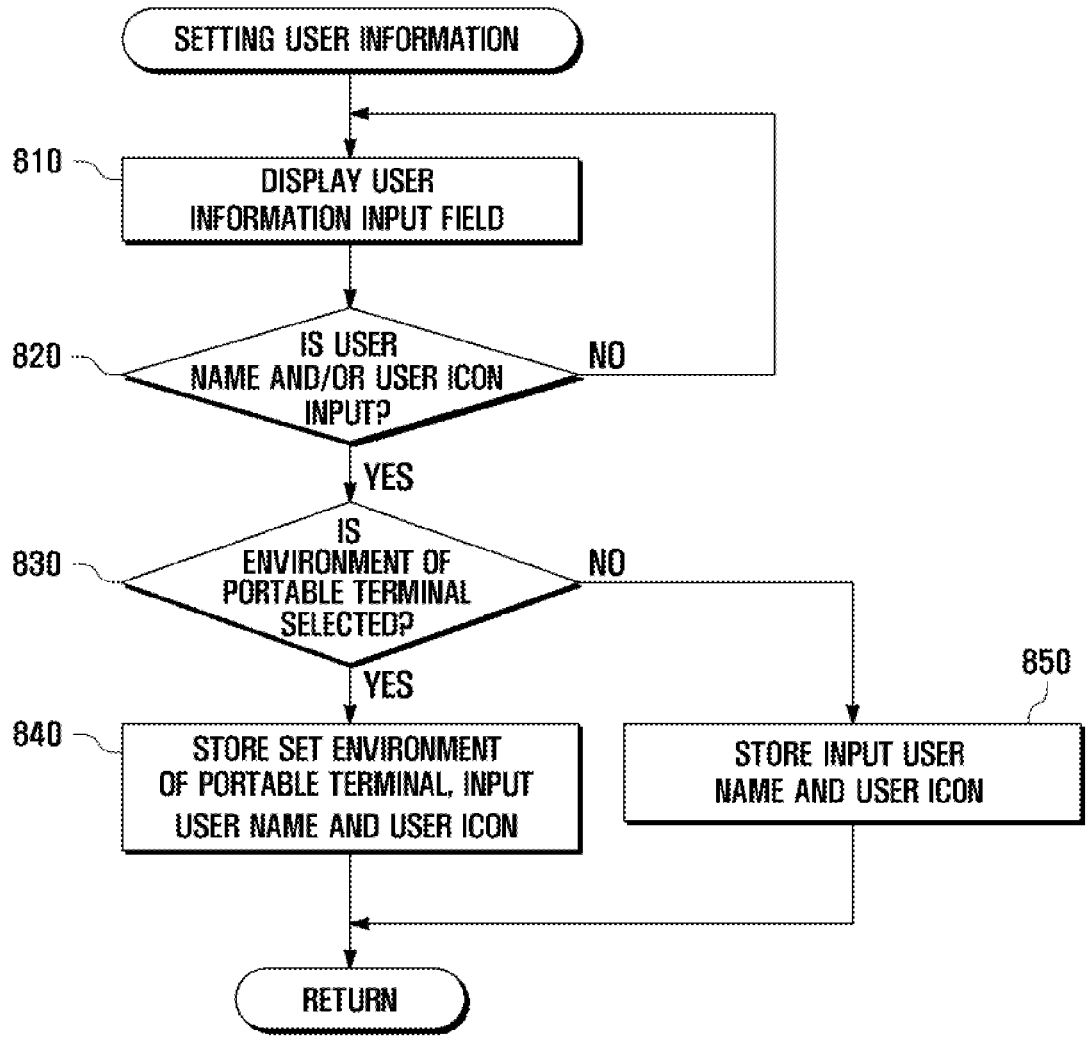
FIG. 8 is a flowchart describing a method for setting user information according to an exemplary embodiment of the present invention.

FIG. 8 is a flowchart describing a method for setting user information according to an exemplary embodiment of the present invention.

Referring to FIG. 8, if it is determined that a user information setting is selected at step 580, the controller 130 displays a user information input field on the display unit 120 in step 810. The user information input field may input a user's name, password, an image for a user icon, etc., via the input unit 150.

The controller 130 determines whether a user's name or user icon is selected via the input unit 150 in step 820. If it is determined that a user's name or user icon is selected at step 820, the controller 130 determines whether preference information is selected to set an environment of the portable terminal in step 830. The preference information contains information regarding a notification function indicating a variety of events occurring in the portable terminal, such as a ringing sound, a vibration mode, information regarding a standby screen while the portable terminal is operated in a standby mode, etc. If it is determined that preference information is selected at step 830, the controller 130 stores the preference information, input user's name, and user icon in the user information 115 of the memory 110 in step 840.

On the contrary, if it is determined that preference information is not selected to set an environment of the portable terminal at step 830, the controller 130 stores only an input user's name, and a user icon in the user information 115 of the memory 110 in step 850.

After performing the storing operation, the controller 130 returns to the procedure of FIG. 5.

Referring back to FIG. 5, if it is determined that a user information setting is not selected at step 580, the controller 130 performs a selected corresponding function in step 590. The selected corresponding function refers to any function executable in the portable terminal, for example, a voice outgoing call, a video outgoing call, a text message transmission, etc. During the operation in the portable terminal, the controller 130 can store a variety of information, such as call log information related to a voice call or a video call, in the memory 110. The controller 130 may include pieces of information, generated as corresponding functions are performed, in user information selected to set a current environment of the portable terminal, and then stores it the memory 110.

Although it is not illustrated in the drawings, the controller 130 may also correct user information 115, stored in the memory 110, according to a user's selection. For example, if user information editing is selected, the controller 130 displays user icons corresponding to user information 115, stored in the memory 110, on the display unit 120. After that, the controller 130 identifies whether a selection is made among the displayed user icons, and then displays user information 115 contained in the identified user icon on the display unit 120. After correcting the user information 115, the controller 130 can store the corrected user information 115 in the memory 110.

As described above, the portable terminal shared by a plurality of users, according to exemplary embodiments of the present invention, can display communication events to be transmitted to the other users while a particular user is using the portable terminal. Therefore, although a particular user is using the portable terminal, the other users can confirm that the portable terminal receives their own communication events, such as text messages or voice calls.

While the invention has been shown described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for displaying events in a portable terminal, the method comprising:
   setting an environment of the portable terminal based on an environment selected from among pieces of user information;
   identifying, if a communication event is received by the portable terminal while it is operated in the set environment, connecting information included in the received communication event;
   determining whether the identified connecting information is included in the selected user information;
   determining, if it is determined that the identified connecting information is not included in the selected user information, whether the identified connecting information exists in other user information; and
   displaying, if it is determined that the identified connecting information exists in other user information, the other user information and the communication event.

2. The method of claim 1, further comprising:
   if it is determined that the identified connecting information exists in other user information, storing the communication event and the identified connecting information, as a missed communication event, in second user information.

3. The method of claim 2, further comprising;
if it is determined that the identified connecting information exists in other user information, determining whether a reception rejection is selected; and
storing, if it is determined that a reception rejection is selected, the identified connecting information in a reception rejection list in first user information.

4. The method of claim 1, further comprising:
determining whether a user information modification is selected;
displaying at least one user icon corresponding to stored user information;
identifying user information corresponding to user information selected from among the displayed user icons; and
setting the environment of the portable terminal according to the identified user information.

5. The method of claim 4, wherein the displaying of the at least one user icon corresponding to stored user information comprises displaying, if the identified user information contains a missed communication event, the missed communication event and the user icon together.

6. The method of claim 4, further comprising:
determining whether the identified user information contains a missed communication event; and
displaying the missed communication event if it is determined that the identified user information contains a missed communication event.

7. The method of claim 6, further comprising:
determining whether the displayed missed communication event is selected by a user, if it is determined that the identified user information contains a missed communication event; and
performing the selected communication event, if it is determined that the displayed missed communication event is selected by the user.

8. The method of claim 7, further comprising:
executing a standby mode, if it is determined that the displayed missed communication event is not selected by the user.

9. The method of claim 4, further comprising:
displaying, if it is determined that the identified connecting information is included in the selected user information, the connecting information and the communication event.

10. A portable terminal whose environments are set according to user information, the terminal comprising:
an RF communication unit for receiving communication events including connecting information;
a memory for storing the connecting information and at least one piece of user information including preference information for setting the environments of the portable terminal;
a display unit for displaying at least one user icon, corresponding to the user information, and the user information including the connecting information of the communication event; and
a controller for setting an environment of the portable terminal according to connecting information selected from among the pieces of user information stored in the memory, for identifying the connecting information of the communication event, received via the RF communication unit, for identifying whether the identified connecting information is included in other user information if the identified connecting information is not included in the selected user information, and for displaying the communication event and the other user information including the identified connecting information, if the identified connecting information is included in other user information.

11. The terminal of claim 10, wherein the controller includes the communication event and the connecting information, as a missed communication event, in the other user information and stores it in the memory.

12. The terminal of claim 11, wherein the controller, if a reception rejection is selected, includes the communication event and the connecting information in a reception rejection list in the selected user information, and stores it in the memory.

13. The terminal of claim 10, wherein the controller, if an environment resetting of the portable terminal is selected, displays at least one user icon corresponding to at least one piece of user information, stored in the memory, on the display unit, and sets the environment of the portable terminal through user information corresponding to a selected user icon.

14. The terminal of claim 13, wherein the controller, if the user information, stored in the memory, contains a missed communication event, displays the user icon and the missed communication event on the display unit together.

15. The terminal of claim 13, wherein the controller, if selected user information contains a missed communication event, displays the missed communication event on the display unit.

16. The terminal of claim 15, wherein the controller determines whether the displayed missed communication event is selected by a user, if the identified user information contains a missed communication event, and performs the selected communication event, if the displayed missed communication event is selected by the user.

17. The terminal of claim 16, wherein the controller executes a standby mode, if the displayed missed communication event is not selected by the user.

18. The terminal of claim 13, wherein the display displays, if the identified connecting information is included in the selected user information, the connecting information and the communication event.

* * * * *